US007258640B2

(12) United States Patent
Schmidt et al.

(10) Patent No.: US 7,258,640 B2
(45) Date of Patent: Aug. 21, 2007

(54) APPARATUS FOR COMPENSATING VISCOUS CHARACTERISTICS OF HYDRAULIC FLUID IN A HYDRAULIC PRESSURE LINE

(75) Inventors: Thilo Schmidt, Meckenbeuren (DE); Georg Gierer, Kressbronn (DE); Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 518 days.

(21) Appl. No.: 10/834,535

(22) Filed: Apr. 29, 2004

(65) Prior Publication Data

US 2004/0222319 A1 Nov. 11, 2004

(30) Foreign Application Priority Data

May 9, 2003 (DE) ................................ 103 20 776

(51) Int. Cl.
*F16H 31/00* (2006.01)
*F16H 59/64* (2006.01)
*F16L 55/027* (2006.01)

(52) U.S. Cl. ........................... 475/127; 477/98; 138/42

(58) Field of Classification Search ................ 475/127, 475/130; 477/127, 130; 138/42, 116.3, 138/85, 625.2, 115.08, 115.09, 115.11, 87.03, 138/87.04

See application file for complete search history.

(56) References Cited

U.S. PATENT DOCUMENTS

| | | | | |
|---|---|---|---|---|
| 1,982,021 | A * | 11/1934 | Renfrew | 184/7.2 |
| 4,418,723 | A * | 12/1983 | Koni et al. | 138/42 |
| 4,955,194 | A | 9/1990 | Christensen et al. | 60/329 |
| 5,076,117 | A * | 12/1991 | Shibayama | 477/98 |
| 5,499,650 | A | 3/1996 | McArthur et al. | 137/85 |
| 5,570,621 | A | 11/1996 | Kabasin | 91/363 R |
| 5,617,890 | A | 4/1997 | Brehm et al. | 137/82 |
| 6,164,141 | A * | 12/2000 | Chalvignac et al. | 73/861.52 |
| 6,213,915 | B1 * | 4/2001 | Bertrand | 477/127 |
| 6,319,164 | B1 * | 11/2001 | Runde et al. | 475/116 |

FOREIGN PATENT DOCUMENTS

| | | |
|---|---|---|
| DE | 37 33 740 A1 | 4/1989 |
| DE | 40 16 748 A1 | 12/1991 |
| DE | 195 36 398 A1 | 4/1996 |
| DE | 44 31 457 C2 | 2/1997 |
| DE | 196 10 494 A1 | 9/1997 |
| DE | 195 33 967 C2 | 1/2000 |
| DE | 101 34 644 A1 | 2/2003 |

* cited by examiner

*Primary Examiner*—Roger Pang
(74) *Attorney, Agent, or Firm*—Davis Bujold & Daniels, P.L.L.C.

(57) ABSTRACT

An apparatus for compensating the viscous characteristics of a hydraulic medium in a pressure line (10) in which apparatus a pressure nozzle (12) with constant geometry and constant through-flow cross-section is located in the pressure line (10). It is provided according to the invention that in the pressure Line (10) upstream or downstream of the pressure nozzle (12) at least one channel-shaped area (11, 28) is made or situated which, compared to the pressure nozzle (12), has a smaller through-flow cross-section and a larger axial extension and that the control pressure (P_SekV) abutting between the channel-shaped area (11, 28) and the pressure nozzle (12) can be supplied via a control pressure line (13) to a shift valve (14).

4 Claims, 3 Drawing Sheets

A: 0.8 bar hollow needle
B: 1.0 bar hollow needle
C: 1.2 bar hollow needle
D: without viscosity-compensation
E: Simulation

APPARATUS FOR COMPENSATING VISCOUS CHARACTERISTICS OF HYDRAULIC FLUID IN A HYDRAULIC PRESSURE LINE

This application claims priority from German Application Serial No. 103 20 776.7 filed May 9, 2003.

FIELD OF THE INVENTION

The invention concerns an apparatus for compensating viscous characteristics of a hydraulic medium in a hydraulic pressure line.

BACKGROUND OF THE INVENTION

It is generally known that hydraulic media, such as hydraulic oils, change their viscosity according to their temperature. In a hydraulic control mechanism this leads to undesirable control and regulation behavior, particularly when the operating temperature of the control mechanism and, therefore, of the control pressure medium vary within a comparatively wide temperature range. Such an operating behavior is to be detected, for example, in a hydraulic transmission control mechanism in a motor vehicle which, as a rule, is placed close to the transmission housing, the same as near the internal combustion engine. It is thus not surprising that in such a device the temperature of the control fluid may range from −40° C. to 180° C.

Springs can be used to compensate for the described temperature-dependent viscous behavior of the control pressure medium, for example, in the hydraulic control devices of automatic transmissions. The springs, made of a metallic alloy with so-called memory effect, act upon the slide valves located there and assume specific geometries depending on the spring temperature thus compensating, by spring forces of different magnitudes, the described characteristics specific to the temperature of the control pressure medium. Springs of variable spring tension can also be used to compensate for the described characteristics. These springs of variable spring tension are so-called wax tensile material elements. Finally, it is also possible to use pressure nozzles at adequate places in the pressure lines of one such hydraulic control apparatus.

These pressure nozzles have cross-sections that change depending on the temperature (so-called thermal nozzles).

In these known compensation means, their altogether insufficient operating safety regarding the durability of a motor vehicle is disadvantageous. Besides, springs with memory effect disadvantageously have only one defined shift point with clearly distinct hysteresis.

The technical problem as described above, especially with regard to hydraulic control mechanisms, has been satisfactorily solved. The solution is described herebelow with the aid of a concrete example or the explanation of which FIG. 1 has been appended to the description.

In the operation of a motor vehicle having an automatic stepped variable speed transmission of an electronic control and regulation device, the same as of a hydraulic control mechanism controlled by the device, the situation may arise where the electric system of the motor vehicle fails. In such a case, the hydraulic control mechanism of that automatic transmission must be capable, independently of the electric control signals, to prepare and carry out 1) a towing operation of the vehicle; 2) to open the transmission with regard to torque transfer, and 3) accordingly bring it to an idling state.

FIG. 1 illustrates that one such uncompensated shift valve at respective constant temperature of the control pressure medium has a control pressure curve depending on engine rotational speed. At a pressure medium temperature of 0° C. and a rotational speed of about 500 U/min with a control pressure of P_Sek=16 bar, according to the curve a, the control valve is fully open while the curves b, c, d, e, f, for the pressure medium temperatures of 20° C., 40° C., 60° C. and 100° C. make clear that this state occurs at rising temperature and continuously higher rotational speeds N_mot. As shown in a comparison between the two curves a and f, there is a difference in rotational speeds of 800 U/min, upon reaching the maximum control pressure P_Sek, especially at low rotational speeds of the engine. This is an undesirably big difference.

FIG. 1 illustrates that one such uncompensated shift valve at respective constant temperature of the control pressure medium has a control pressure curve depending on engine rotational speed. According to the curve a, at a pressure medium temperature of 0° C. and a rotational speed of about 500 U/min with a control pressure of P_Sek=16 bar, the control valve is already fully open while the curves b, c, d, e, f, for the pressure medium temperatures of 20° C., 40° C., 60° C. and 100° C. make clear that this state occurs at rising temperature and continuously higher rotational speeds N_mot. As shown by a comparison between the two curves a and f, there are between reaching of the maximum control pressure P_Sek about 800 U/min, which is an undesirably big difference specifically at low rotational speeds of the engine.

With this background, the problem to be solved by the invention is, therefore, to introduce an apparatus by means of which a shifting behavior of the shift valve is not temperature dependent or is at least less temperature dependent than has been hitherto usual such that, for example, in the described emergency operation situation, the automatic transmission can be shifted to idling a speed in the proximity zone of a previously established rotational speed of the engine.

SUMMARY OF THE INVENTION

The invention is based on the knowledge that a hydraulic medium, in comparatively long and thin fluid lines, has a very viscous behavior while an axially short pressure nozzle or throttle in the first place varies the through-flow only according to the thickness of the hydraulic medium thus producing a comparatively sharp pressure drop. Therefore, the basic idea of the invention is to compensate the viscous behavior of a hydraulic medium by a serial mounting of pressure nozzles having different temperature behaviors.

By a logical combination of a comparatively long and thin line section upstream of a conventional pressure nozzle, it is possible to caliper a control pressure downstream, between the long and the thin line section and the pressure nozzle by virtue of this arrangement, the above described temperature-dependent viscosity of the control pressure medium in a manner is compensated such that a shift valve controlled with said control pressure has, independently of the temperature of said control pressure medium, a shift point in the proximity of a preset engine rotational speed.

The apparatus for compensating viscous characteristics of a hydraulic medium in a pressure line is accordingly constructed so that a pressure nozzle of constant geometry and constant through-flow cross-section is located in this pressure line and that upstream or downstream of said pressure nozzle is at least one channel-shaped area which, compared with the pressure nozzle, has a smaller through-flow cross-section and a larger axial extension. The viscosity-compensated control pressure for a downstream shift valve is calipered in this apparatus between the channel-shaped area and the pressure nozzle.

The channel-shaped area is preferably placed between two conventionally designed pressure nozzles wherein, by adequate layout of the pressure nozzle situated upstream before the channel-shaped area, it is possible to pilot control the hydraulic pressure that becomes operative in this channel-shaped area.

In one other design of the invention, the channel-shaped area is made as a pressure line portion having a diameter reduction of the pressure line lying before and/or behind it over a predetermined zone.

Another development of the invention departs from the fact that the channel-shaped area is designed as at least one spiral-shaped duct on the outer periphery of the elongated, preferably cylindrical nozzle.

This channel-shaped area, however, can also be designed as at least one elongated duct on the outer periphery of an elongated, preferably cylindrical, pressure nozzle and/or as at least one elongated aperture in said pressure nozzle.

Another advantageous feature of the invention is that the preferably cylindrical pressure nozzle with the channel-shaped area is situated in a housing which has one upstream inlet opening and one downstream outlet opening for the control pressure medium. It is deemed advantageous here that the through-flow cross-section of both apertures are smaller than the inner diameter of the interior space of the housing. Such a housing with integrated cylindrical pressure nozzle with the channel-shaped area can also be installed in already existing hydraulic zones, such as in large-scale plants.

In one other development of the preferably cylindrical, pressure nozzle with channel-shaped area, it is provided that the housing of the pressure nozzle has a hollow cylindrical section and one cap that shuts said section so that in such a housing can be inserted as needed cylindrical, pressure nozzles of different shapes with one or less long and/or thin channel-shaped area.

It can further be provided that in the pressure nozzle housing, one cylindrical, pressure nozzle is introduced on each front side of which one respective pivot is made and the front side surfaces of which rest on the inner side of the housing cap and of the housing bottom.

Insofar as the inventive apparatus is to be used, for example, in a hydraulic transmission control apparatus, in order to obtain desired results, the channel-shaped area must preferably be designed so as to have a length of from 50 mm to 120 mm, preferably from 60 mm to 100 mm and most preferably of from 80 mm to 90 mm, while the pressure nozzle(s) have an axial length of from 0.4 mm to 1.6 mm, preferably 0.6 mm to 1.4 mm and most preferably of from 0.8 mm to 1.2 mm.

When used in a hydraulic transmission control apparatus, in order to obtain good results, the aperture diameter of the channel-shaped area must amount to from 0.5 mm to 1.5 mm, preferably from 0.6 mm to 1.2 mm and most preferably of from 0.7 mm to 0.9 mm while the pressure nozzle(s) must have an aperture diameter of from 0.4 mm to 1.6 mm, preferably from 0.7 mm to 1.4 mm and most preferably of from 1.1 mm to 1.3 mm.

By a logical combination of said measurements, it is possible to achieve different compensation effects and engine rotational-speed dependencies of the control pressure acting upon the shift valve.

The viscosity-compensated, control pressure abutting between the channel-shaped area and the conventional pressure nozzle, as already observed, can be used to pressurize a shift valve. For this purpose, the inventive apparatus is situated in a hydraulic sliding case of an automatic transmission, preferably between a main pressure valve and a shift valve.

By means of this arrangement, it is possible to supply said shift valve with the abutting control pressure, via a separate control pressure line, between the channel-shaped area and the closest pressure nozzle preferably disposed downstream.

With this shift valve, the shift element(s) (clutches and/or brakes) of the automatic transmission is preferably loaded with control pressure with which a reduction ratio of a transmission can be activated or deactivated. At the same time, in case of the viscosity-compensated control pressure abutting on the separate pressure line dropping below a predetermined minimum value dependent on the rotational speed of the engine, the transmission is shifted to an idling speed by actuating the shift valve.

According to the invention, it can also be provided that the channel-shaped area, the same as a conventionally designed pressure nozzle, be designed as part integrated and insertable in the control pressure line or a transmission slide valve casing wherein said part has between the channel-shaped area and the area of the conventional pressure nozzle, one aperture for the branching off of the control pressure abutting there into the pressure line leading to the shift valve, or such a branching off be associated with said site.

Finally, as a component part of the invention, the channel-shaped area is situated or made upstream or downstream of the conventionally designed pressure nozzle, similar to the upstream or downstream of the branching off for the pressure line leading to the shift valve. In this manner, in the pressure line leading to the shift valve when implementing the first variant, it is possible to establish a rising pressure P_SekV in case of rising temperature T_ÖL of the control pressure medium and, when implementing the second variant, a dropping pressure P_SekV. Thus result, for example, fields for application of the inventive apparatus also in the area of the through-flow control for a radiator, the same as for control of the lubricant volume.

To make clear the physico-technical relationships, the same as an apparatus designed according to the invention, accompanying the description is a drawing showing:

BRIEF DESCRIPTION OF THE DRAWINGS

The invention will now be described, by way of example, with reference to the accompanying drawings in which.

DETAILED DESCRIPTION OF THE INVENTION

Figure 3:
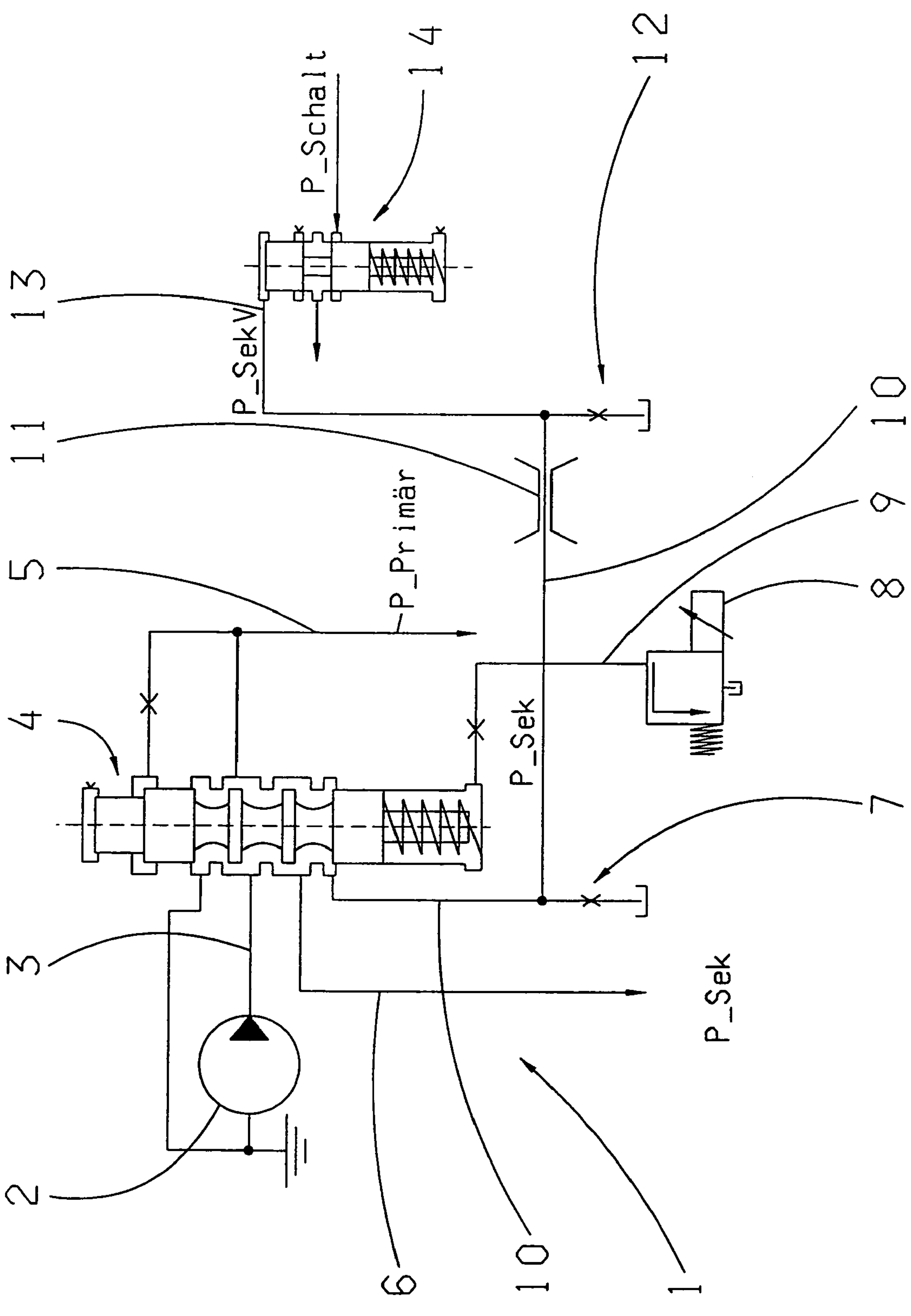
FIG. 3 is a schematic representation of an apparatus for compensating the temperature-dependent viscous characteristics of the hydraulic control pressure medium in a hydraulic transmission control device.

FIG. 3 shows in a concrete embodiment how the inventive apparatus for compensation of the viscous characteristics of a hydraulic medium can be introduced in a pressure line in a hydraulic transmission control apparatus. In the illustrated section of a transmission control apparatus 1, one pump 2 is reproduced which is mechanically driven by the vehicle engine and supplies one main pressure valve 4 with hydraulic oil under a main pressure via a pressure line 3.

While in a primary pressure line outcrops, the hydraulic main pressure P_Primär less relevant for the further observations and transmitted by the main pressure valve 4, there prevails in a line 9 leading to a control valve 8, a hydraulic pressure divergent therefrom.

Of special significance for the invention is a pressure line 10 in which prevails, the same as in the pressure line 6, a secondary control pressure P_Sek produced by the main pressure valve 4. Directly behind the main pressure valve 4 is a first pressure nozzle 7 tied in the pressure line 10 the significance of which will be later discussed.

Downstream of the pressure nozzle 7 in the control pressure line 10, a channel-shaped area 11 is made in which the diameter cross-section of the pressure line 10 is clearly smaller than the area situated before and behind it. Downstream behind said channel-shaped area 11, a second pressure nozzle 12 is placed, the leakage of which the same as the leakage of the first pressure nozzle 7 can be used for transmission lubrication, transmission cooling and/or prefilling of transmission shift elements. But the leakage of the first pressure nozzle 7 can also be led back to the suction side of the pump 2 in order to compensate suction losses by an oil filter (not shown here).

A pressure line 13 branches off from the pressure line 10 from between the channel-shaped area 11 and the second pressure nozzle 12 and leads to a shift valve 14 and in which the control pressure P_SekV prevails. While this control pressure P_SekV lies below a predetermined pressure value, the shift valve 14 shifts and interrupts the pressure supply of a transmission clutch, so that the transmission is brought to an idling shift position.

Since the main pressure P_Primär, produced by the pump 2, depends on the engine rotational speed, it is possible to move the shift point of the shift valve 14 to a higher or lower rotational speed of the engine by adequate dimensioning of the already mentioned additional pressure nozzle 7 before the channel-shaped area 11.

By adept dimensioning, still to be described at length, the same as of the diameter of the channel-shaped area 11, the same as of the axial length and of the diameter cross-section of the second pressure nozzle 12, a compensation of the temperature-dependent viscosity change of the control pressure medium can be achieved. The shift valve 14 is thereby capable of performing a shift operation independently of the temperature of the control pressure medium and dependent only on the rotational speed of the vehicle engine. Such a shifting operation can be the actuation of a transmission shifting element (clutch or brake) of the automatic transmission with which the automatic transmission is shifted to idling in an emergency operation in the absence of an electric shifting command.

Figure 5:
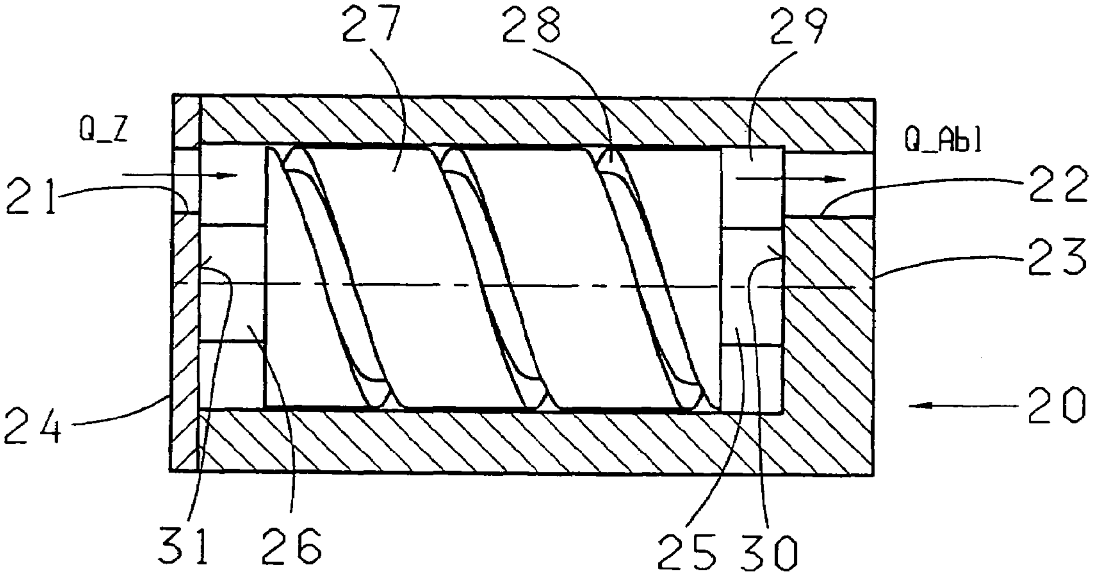
FIG. 5 is a diagrammatic representation of the design of a pressure nozzle with spiral groove in a control pressure line.

As already mentioned, the channel-shaped area 11 can be easily produced by narrowing the pressure line 10 over a predetermined length to a predetermined through-flow cross-section. One variant differing therefrom is shown in FIG. 5. This design consists in the first place of one housing 20 which comprises a hollow cylindrical part 23 and a cap 24 that shuts the hollow cylindrical part 23. In the cap 24 is made an inlet aperture 21 for a volume current Q_Z and, in the hollow cylindrical part 23, an outlet aperture 22 for the volume current Q_Abl through which the control medium penetrates in a housing interior 29 and can discharge therefrom.

As already mentioned, the channel-shaped area 11 can be easily produced by narrowing the pressure line 10 over a predetermined length to a predetermined through-flow cross-section. One variant differing therefrom is shown in FIG. 5. This design consists in the first place of one housing 20 which comprises a hollow cylindrical part 23 and a cap 24 that shuts the part 23. In the cap 24 is made an inlet aperture 21 for a volume current Q_Z and, in the hollow cylindrical part 23, an outlet aperture 22 for the volume current Q_Abl through which the control medium penetrates in a housing interior 29 and can discharge therefrom.

Additionally located in the housing 20 is one pressure nozzle 27 which is to a great extent cylindrically designed and has a spiral-shaped groove 28 on its outer periphery which exerts the function of the channel-shaped area 11 according to FIG. 3. There are further disposed on both front sides of the pressure nozzle 27 pivots 25 and 26 whose front faces 30, 31 rest on the inner side of the cap 24 and of the bottom of the cylindrical housing part 23.

By means of the construction described, the inventively designed channel-shaped area 20, 27, 28 can be introduced easily and without great constructional changes into an already existing control pressure line system. The length of the spiral-shaped groove 28 operative for viscosity compensation can here be adapted to the desired control and operating limiting conditions. It is thus possible to insert in the housing 20, for example, a pressure nozzle of different shape such as with paraxially peripheral grooves or one with one or more apertures.

The channel-shaped area 11, the same as 20, 27, 28, can be economically produced as an injection molding part or also as a swivel part.

Figure 1:
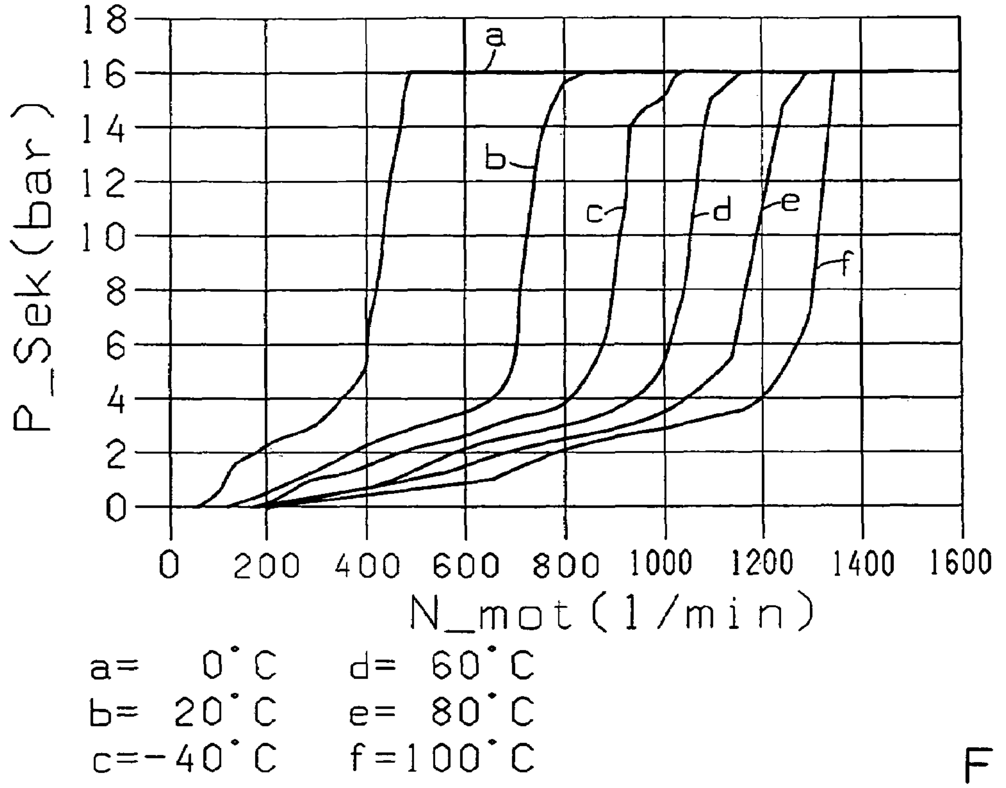
FIG. 1 is a shift pressure-engine rotational speed diagram with control pressure curves of a shift valve under different temperatures of the pressure medium.

The temperature or viscosity compensation of the control pressure medium is achieved here as follows:

As already mentioned above, the curves in FIG. 1 show at which engine rotational speeds N_mot, an uncompensated hydraulic shift valve 14 is brought, depending on the temperature of the control pressure medium, to a desired shifting state which is here defined as the saturation pressure (P_Sek=16 bar) of the shift valve 14 at which the latter is fully opened.

Figure 2:
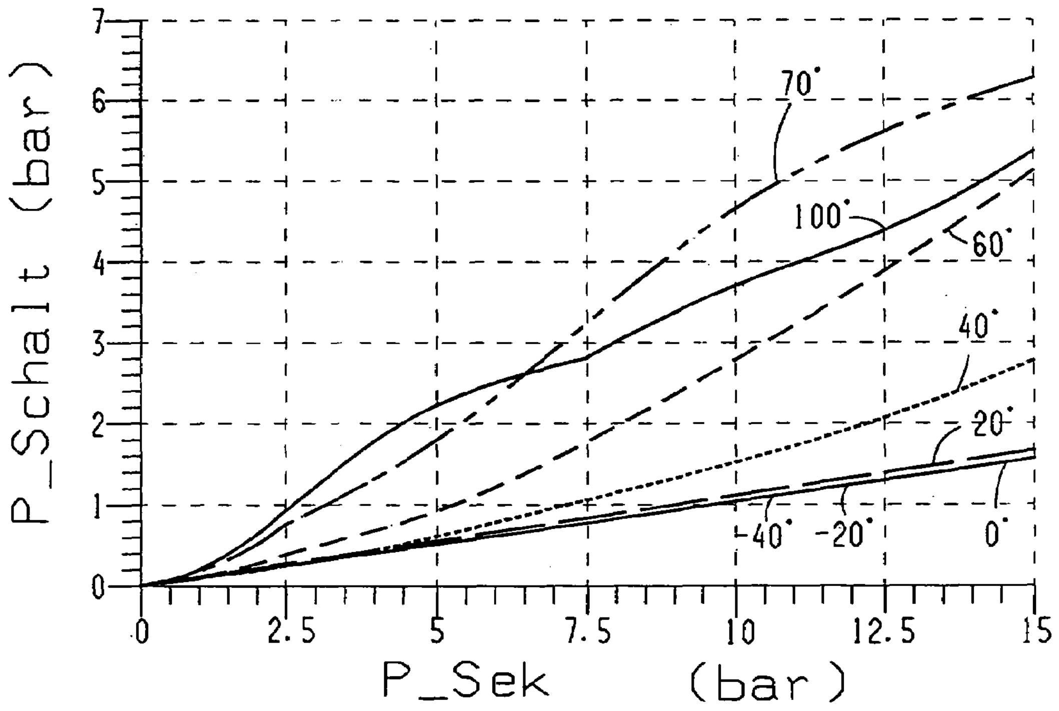
FIG. 2 is a diagram representing the temperature dependence of the shift pressure on the shift valve of an uncompensated secondary control pressure.

It can further be understood from FIG. 2 that the shift pressure P_Schalt, shiftable by the shift valve 14, depends on the height of uncompensated control pressure P_Sek and on the temperature T_ÖL of the control pressure medium.

According to the invention, via the already mentioned combination of line length line diameter and pressure nozzle diameter, if the control pressure between a channel-shaped area 11 in the pressure line 10 and the pressure nozzle 12 is now calipered, there results a shifting pressure P_SekV for the shift valve 14 connected with the pressure line 13 which depends on the secondary control pressure abutting upstream of the channel-shaped area 11, the same as on the temperature of the pressure control medium.

Due to the interaction of the behavior dependent on temperature and rotational speed of the secondary control pressure P_Sek (shown in FIG. 1 and FIG. 2), there appears a compensation of the viscosity changing according to temperature of the control pressure medium.

Figure 4:
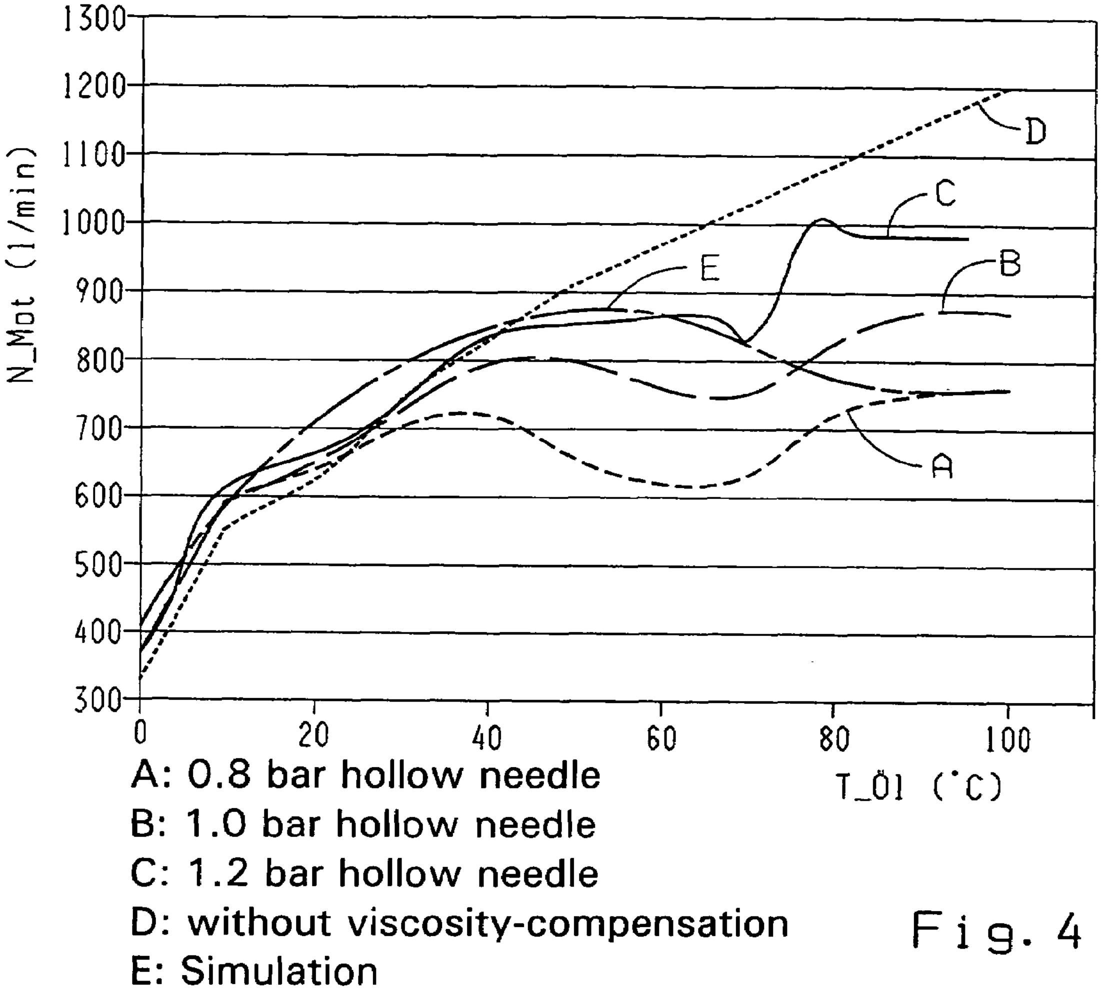
FIG. 4 is a diagram indicating the engine rotational speed at which an automatic transmission is shifted to idling speed depending on the temperature of the control pressure medium for the shift valve.

FIG. 4 shows, with the aid of a few graphs A to D, the complete shifting behavior of the shift valve 14. The graph E indicates a curve pre-calculated by a computer program of the engine rotational speed N_Mot at which the shift valve 14 shifts according to the temperature T_ÖL of the control medium, the channel-shaped area having a length of 88 mm and a passage cross-section of 1.1 mm while the pressure nozzle 12, mounted downstream of the channel-shaped area 11, has a passage cross-section of 0.7 mm.

This pre-calculated curve E shows quite clearly that the shift valve 14 shifts within a temperature range of from 20° C. to 100° C. at engine rotational speeds of from 700 U/min to 850 U/min which signifies a clear improvement compared to the uncompensated shift behavior shown by the curve D.

Complementing this, the measurement results shown in the curves A to C of concretely performed tests under the above mentioned limiting conditions (channel-shaped designed area with a length=88 mm; passage cross-section of this area=1.1 mm; passage cross-section of the pressure nozzle 12 downstream of the channel-shaped area corresponds to 0.7 mm) disclose that at a shifting pressure P_Schalt of 0.8 bar on the shift valve the best results were to be tabulated.

As the graph B shows in this connection, it could be possible under said limiting conditions to obtain a comparatively good independence of the shift point of the shift valve 14 (expressed by the engine rotational speed N_mot) relative to the temperature T_ÖL of the control pressure medium. The measuring points of graph B also show that the shift valve 14 shifts when the engine rotational speed N_Mot amounts to from 600 U/min to 880 U/min and the temperature T_ÖL is between 10° C. and 100° C.

However, the measuring points forming Graphs B and C, which were measured at shifting pressure P_Schalt of 1.0 bar or P_Schalt of 1.2 bar, still show comparatively good independence of the engine rotational speed N_Mot at which the shift valve 14 fully shifts.

REFERENCE NUMERALS

| | |
|---|---|
| 1 | hydraulic control apparatus |
| 2 | pump |
| 3 | pressure line |
| 4 | main pressure valve |
| 5 | primary pressure line |
| 6 | secondary pressure line |
| 7 | first pressure nozzle |
| 8 | control valve |
| 9 | pressure line to regulating valve 8 |
| 10 | pressure line between pressure nozzles 7, 12 |
| 11 | channel-shaped area |
| 12 | second pressure nozzle |
| 13 | pressure line to the shift valve 14 |
| 14 | shift valve |
| 20 | housing |
| 21 | inlet aperture |
| 22 | outlet aperture |
| 23 | cylindrical housing part |
| 24 | cap |
| 25 | pivot |
| 26 | pivot |
| 27 | cylindrical pressure nozzle |
| 28 | spiral groove |
| 29 | interior of the pressure nozzle |
| 30 | front side surface |
| 31 | front side surface |

The invention claimed is:

1. An apparatus for compensating the viscous characteristics of a hydraulic medium in a pressure line (10), the apparatus comprising:

a first pressure nozzle (12) and at least one channel-shaped area (11, 28) connected in series in the pressure line (10), and the at least one channel shaped area (11, 28) being located one of upstream and downstream of the first pressure nozzle (12);

the first pressure nozzle (12) being of constant geometry and a constant through-flow crass-section;

the at least one channel-shaped area (11, 28) having a smaller through-flow cross-section and a larger axial extension than the first pressure nozzle (12);

a control pressure line (13), connected between the channel-shaped area (11, 28) and the first pressure nozzle (12), to provide a control pressure (P_SekV) to a shift valve (14); and said channel-shaped area (11) being at least one spiral duct (28) on the outer periphery of a pressure nozzle (27).

2. An apparatus for compensating the viscous characteristics of a hydraulic medium in a pressure line (10), the apparatus comprising:

a first pressure nozzle (12) and at least one channel-shaped area (11, 28) connected in series in the pressure line (10), and the at least one channel shaped area (11, 28) being located one of upstream and downstream of the first pressure nozzle (12);

the first pressure nozzle (12) being of constant geometry and a constant through-flow cross-section;

the at least one channel-shaped area (11, 28) having a smaller through-flow cross-section and a larger axial extension than the first pressure nozzle (12);

a control pressure line (13) connected from between the channel-shaped area (11, 28) and the first pressure nozzle (12) to provide a control pressure (P_SekV) to a shift valve (14);

the channel-shaped area (11) is a control line member;

said pressure nozzle (27) is cylindrically designed; and said cylindrical pressure nozzle (27) is situated in a housing (20) with an upstream inlet aperture (21) and a downstream outlet aperture (22), a through-flow cross-section of the inlet and outlet apertures (21; 22) being smaller than an inner diameter of the housing interior (29).

3. The apparatus according to claim 2, wherein said pressure nozzle housing (20) has one hollow cylindrical section (23) and one cap (24) shutting said section (23).

4. The apparatus according to claim 3, wherein one cylindrical pressure nozzle (27) is inserted into a pressure nozzle housing (20), on two front side ends of the cylindrical-pressure nozzle (27) one respective pivot (25; 26) is made whose front side surfaces (30; 31) rest on an inner side of the cap (24) and of the housing bottom.

* * * * *